United States Patent [19]

Chang et al.

[11] 4,225,850

[45] Sep. 30, 1980

[54] NON-FINGERPRINT REGION INDICATOR

[75] Inventors: Tien-Lin Chang, Orange; Jimmy H. Kabaian, Santa Ana; John P. Riganati, Yorba Linda; Stanley A. White, Santa Ana, all of Calif.

[73] Assignee: Rockwell International Corporation, El Segundo, Calif.

[21] Appl. No.: 960,813

[22] Filed: Nov. 15, 1978

[51] Int. Cl.² .......................... G06K 9/00; A61B 5/10
[52] U.S. Cl. ............................ 340/146.3 E; 364/726
[58] Field of Search ................. 340/146.3 E, 146.3 R, 340/146.3 H; 356/71; 350/162 SF; 364/576, 726; 324/77 B, 77 CS

[56] References Cited

U.S. PATENT DOCUMENTS

| | | | |
|---|---|---|---|
| 3,771,124 | 11/1973 | McMahon | 340/146.3 E |
| 3,771,129 | 11/1973 | McMahon | 340/146.3 E |
| 3,873,970 | 3/1975 | McMahon | 340/146.3 E |
| 3,891,968 | 6/1975 | McMahon | 340/146.3 E |
| 3,944,978 | 3/1976 | Jensen et al. | 340/146.3 E |
| 4,156,230 | 5/1979 | Riganati et al. | 340/146.3 E |
| 4,160,237 | 7/1979 | McMahon | 340/146.3 E |

Primary Examiner—Leo H. Boudreau
Attorney, Agent, or Firm—L. Lee Humphries; H. Fredrick Hamann; Rolf M. Pitts

[57] ABSTRACT

Signalling means for enhancing the performance of automatic fingerprint identification systems by reducing system response to non-fingerprint-like regions within an image field pattern of interest. A two dimensional generalized sequency analyzer, such as a fast Fourier transform machine, responsive to a binary coded image signal identifies discrete frequency terms occurring within a selected bandwidth corresponding to a spatial frequency region of interest, associated with a fingerprint image. Logic means, responsive to the sequency analyzer, further identifies the relative energy levels of the bandwidth-limited spectral content of the binary coded image signal to signal the identity of a non-fingerprint-like region within the scanned image.

29 Claims, 22 Drawing Figures

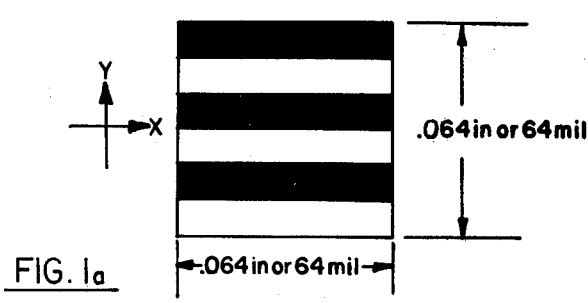
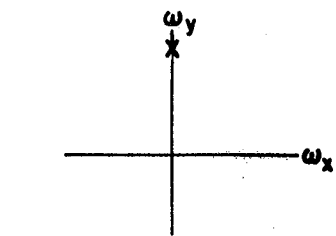
FIG. 1a          FIG. 1b
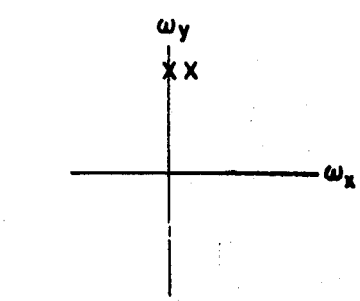
FIG. 2a          FIG. 2b
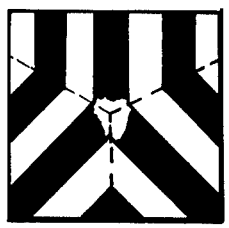
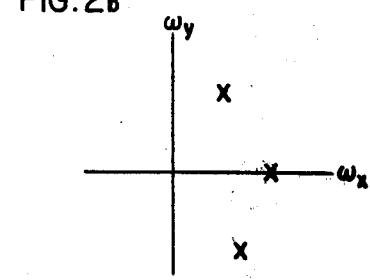
FIG. 3a          FIG. 3b
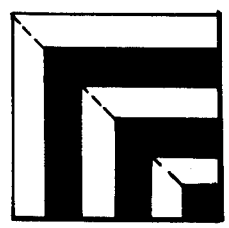
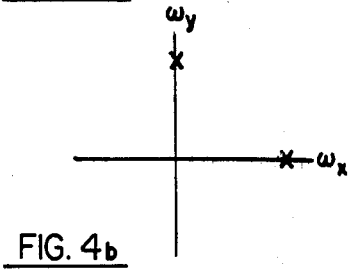
FIG. 4a          FIG. 4b
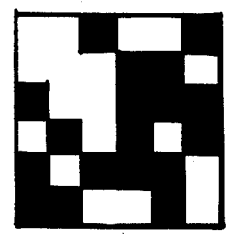
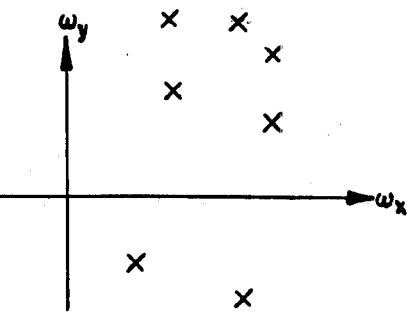
FIG. 5a          FIG. 5b

NON-FINGERPRINT REGION INDICATOR

The invention herein described was made in the course of or under a contract or subcontract with the U.S. Government.

CO-PENDING APPLICATIONS

1. Application Ser. No. 722,308 filed Sept. 10, 1976 for MINUTIAE PATTERN MATCHER by John P. Riganati et al, now U.S. Pat. No. 4,135,147.
2. Application Ser. No. 722,244 filed Sept. 10, 1976 for AUTOMATIC PATTERN PROCESSING SYSTEM by John P. Riganati et al, now U.S. Pat. No. 4,151,512.
3. Application Ser. No. 847,987 filed Nov. 2, 1977 for METHOD AND APPARATUS FOR AUTOMATIC EXTRACTION OF FINGERPRINT CORES AND TRI-RADII by John P. Riganati et al, now U.S. Pat. No. 4,156,230.
4. Application Ser. No. 934,657 filed Aug. 17, 1978 for SYSTEM FOR EXPANDING THE VIDEO CONTRAST OF AN IMAGE by Stanley A. White et al.

BACKGROUND OF THE INVENTION

1. Field of the Invention

This invention relates to pattern identification systems and more particularly to a non-fingerprint-like region indicator for indicating whether or not a region or portion of a pattern of interest is free of fingerprint-like pattern data, as to be of no interest in the processing of such pattern.

2. Description of the Prior Art

The advent of high speed digital data processors has enabled the mass handling of fingerprint pattern data by automatic data retrieval and pattern identification systems. Such systems involve the treatment of an image as a large matrix of many discrete elements which provide a mosaic pattern resembling the image of interest. For a grey-coded image, for example, each discrete element or pixel thus has an intensity score of weighting and also an assigned set of coordinates corresponding to the position of such pixel in the image plane or field.

The range of average pixel intensity (for the pixels in a given region) may be quite wide over the large number of regions comprising the total image pattern. Due to dynamic range limitations of the data processing equipment, such range of average pixel intensity over such regions may need be compressed or "normalized" relative to equipment performance limitations. Such gain normalization may be achieved in a manner corresponding to automatic gain control techniques. In this way, image definition is retained in each region or sub-pattern of the overall pattern, without either saturating the equipment (by regions with strong average intensities) or losing image definition (in regions of weak average intensities).

Other equipment limitations occur with regard to logic limitations of the pattern matcher to correlate an imperfect, broken, smudged or dirty image with a clean reference image. Such image-data processing limitations have led to the development of pre-processors for masking or editing such image data, whereby the image content thereof could be made more useful to the pattern identification system, rather than rejected as a mismatch or pattern not of interest.

Still further devices have been devised for reducing the volume of the data retrieval and processing involved in the pattern matching process by the use of automatic image classification techniques. By means of such techniques, recognized fingerprints are classified in accordance with image classifications occurring in the automatic pattern recognition process. An automatic recognition process of interest is the encoding of minutiae data of a fingerprint into a relative information vector (RIV) format. Other techniques include the identification of cores and deltas. An exposition of exemplary forms of such pattern processing techniques is included in the following copending patent applications, all of which are assigned to Rockwell International Corporation, assignee of the subject patent application:

1. Application Ser. No. 722,308 for MINUTIAE PATTERN MATCHER, filed Sept. 10, 1976 by John P. Riganati et al
2. Application Ser. No. 722,244 for AUTOMATIC PATTERN PROCESSING SYSTEM, filed Sept. 10, 1976 by John P. Riganati et al
3. Application Ser. No. 847,987 for METHOD AND APPARATUS FOR AUTOMATIC EXTRACTION OF FINGERPRINT CORES AND TRI-RADII, filed Nov. 2, 1977 by John P. Riganati et al
4. Application Ser. No. 934,657 for SYSTEM FOR EXPANDING THE VIDEO CONTRAST OF AN IMAGE, filed Aug. 17, 1978 by Stanley A. White et al.

However, all of such fingerprint pattern recognition systems require pre-processing or pre-editing of regions of the image data, not only to format the data in a form and style compatible with the pattern recognition system mechanization, but to also either fix-up or edit-out useless regions of an otherwise useful image of interest, so as to avoid "false alarms" and unnecessary rejects or useless attempts to perform pattern recognition of unrecognizable data.

What is desired is further means for indicating or pre-editing pattern data signals relative to non-fingerprint-like regions within an image field or pattern of interest, with a view to reducing unnecessary processing of less relevant image data and improving the consequent quality and speed of image matching.

SUMMARY OF THE INVENTION

By means of the concept of the invention there is provided signalling means for enhancing the performance of automatic fingerprint identification systems by reducing the system response to local non-fingerprint regions of an image field pattern of interest. Such non-fingerprint region indicator or signalling means may be employed to "vote" with or to supplement the editing provided by other pre-editing systems or used in lieu of other types of pre-editing of electrical image-pattern signals.

In a preferred embodiment of the invention there is provided a two-dimensional generalized sequency analyzer, such as a fast Fourier transform (2D-FFT) machine or the like, responsive to a binary-coded image signal for identifying discrete frequency terms occurring within a selected bandwidth corresponding to a spatial frequency region associated with descriptions of a fingerprint image. There is also provided logic means responsive to the bandwidth limited generalized transform analyzer for further identifying the relative energy levels of the bandwidth-limited spectral content of the binary-coded image signal to provide the identity of a non-fingerprint region within the scanned image, represented by the binary-coded signal.

In normal operation of the above-described arrangement, the failure to detect discrete frequency terms indicative of a fingerprint in a particular region of a scanned image results in a "non-fingerprint-like region" indication for such region. Such indication may be used to avoid, screen, block or edit-out such region from the image pattern being subjected to the pattern recognition process. In this way, the processing time required to effect the overall pattern recognition process may be reduced, and the certainty of recognition is improved by the exclusion of image data not of interest.

Accordingly, it is an object of the invention to enhance the performance of automatic fingerprint pattern recognition systems.

It is another object of the invention to provide alternative signalling means for supplementary pre-editing of grey-coded electrical signals corresponding to a scanned fingerprint image for providing an indication of a non-fingerprint-like region within such image.

It is a further object to distinguish a non-fingerprint-like region amid a fingerprint image of interest by the relative absence (from said region) of discrete fast Fourier transform elements within a preselected bandwidth of spatial frequencies.

A still further object is to identify a non-fingerprint-like region of an image as being an image region not of interest in the pattern recognition of fingerprint patterns.

These and other objects of the invention will become readily apparent from the following description, taken together with the accompanying drawings in which:

BRIEF DESCRIPTION OF THE DRAWINGS

FIGS. 1a and 1b are a representative spatial bar pattern and its associated Fourier transform.

FIGS. 2a and 2b are a stylized minutia pattern and the location of its Fourier components in a half plane.

FIGS. 3a and 3b are a stylized delta pattern and the location of its Fourier components in a half plane.

FIGS. 4a, 4b and 4c are a stylized core-like pattern and its Fourier components in a half plane.

FIGS. 5a and 5b are a representative noisy pattern and the location of its Fourier components in the half plane, which

DESCRIPTION OF THE PREFERRED EMBODIMENT OF THE INVENTION

The purpose and function of the invention described herein is to supplement or augment the pre-edit or preliminary image signal conditioning and masking in an automatic fingerprint identification system, by indicating the probable absence of fingerprint-like structure in an identified region of a fingerprint pattern of interest. The performance of such function involves a consideration of the gross structure of a fingerprint pattern, and treats a local region of a fingerprint pattern as a system of thick parallel lines. The gross structure of a fingerprint pattern resembles parallel thick curves. However, within a local region, these curves appear as almost straight lines.

Several exceptions to such appearance of a local fingerprint region appearance as parallel thick line structure are:

1. the existence of minutia
2. the existence of cores and deltas
3. the existence of gaps, pores and scars and other noise effects, such as poor contrast and smudging.

The last item (image noise) may be internal to the specific fingerprint itself (gaps, pores, scars) or due to the quality of the detection and reproduction of the print (poor contrast and smudging).

It has been discovered that an examination of the spatial frequency spectral content or Fourier transform term provides a means of automatically detecting and indicating a non-fingerprint region within a fingerprint pattern field of interest. Referring to FIG. 1a there is illustrated a representative spatial bar pattern corresponding to a fingerprint-like region within a fingerprint pattern field of interest. As illustrated, a vertical array of three horizontally parallel lines or ridges is interleaved by three valleys for a region or frame 64 mils square (0.064 inches by 0.064 inches), corresponding to a spatial periodicity of three cycles per frame. However, it has been determined that within the reference region or frame size (0.064"×0.064") the contemplated spatial periodicity includes the range from 2 to 5 cycles per frame. The corresponding predominant frequency term is shown in FIG. 1b, the ordinate, $\omega_y$, of which represents spatial frequency in a reference or vertical direction, and abscissa, $\omega_x$, of which represents spatial frequency occurring in a directional orthogonal to the first direction.

The existence of a minutia region, as illustrated in idealized form in FIG. 2a, produces two predominant Fourier terms, spaced somewhat closely together in the frequency domain, as shown in FIG. 2b. Such idealized form of FIG. 2 may be viewed as if produced by rotation of the lower lines of FIG. 1, with the two frequency terms of FIG. 2b resulting from a decomposition of the predominant term of FIG. 1b.

Figure 4C:
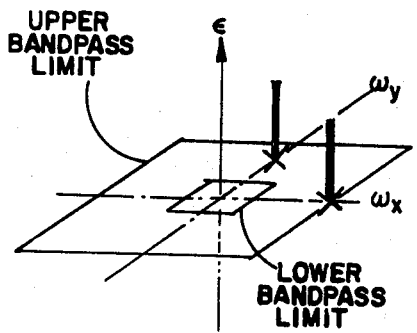

For a delta-like region (of a fingerprint), as illustrated in the idealized form in FIG. 3a, three predominant Fourier terms occur, as shown in FIG. 3b. For a core-like region (of a fingerprint), as illustrated by the idealized form of FIG. 4a, two (somewhat like) predominant discrete Fourier frequency terms occur, displaced 90° apart as shown in FIG. 4b, the amplitude of such high power or predominant terms being shown (in the $\omega$ axis) in FIG. 4c.

Figure 5C:
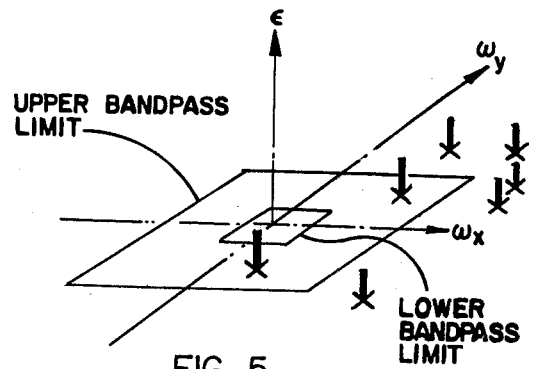
FIG. 5c illustrates the magnitudes of the associated Fourier coefficients.

A Fourier transform estimate of a noisy pattern (FIG. 5a) usually results in many low-energy, higher-frequency terms, a typical representation for which is shown in FIG. 5b. The low energy content of such Fourier terms of FIG. 5b are shown in the ω axis of the discrete spectral energy distribution depicted in FIG. 5c, and is to be compared with the energy levels depicted in FIG. 4c for the spectral distribution of FIG. 4b. For a light or datk patch, (i.e., little or no pattern), the discrete Fourier terms would be clustered about the origin in FIG. 5b.

In view of the foregoing, it is to be appreciated that a means of testing a spatial spectrum of interest for fingerprint content or identification as a non-fingerprint indicating region has been conceived as a combination of bandpass limiting of the spatial spectrum response to within a preselected spatial frequency region of interest. Such bandpass limited discrete Fourier transform response region is depicted graphically in FIG. 6, as excluding frequencies above and below those corresponding to 2–5 cycles per 64 mil frame. Thus, both high frequency noise and low spatial frequency modulation terms are discarded. Referring again to FIG. 5c, showing the spectral energy distribution associated with a noisy or noise-type pattern, it is to be seen that many of the discrete frequency Fourier terms associated therewith would lie outside the preselected bandpass region, while those terms within the bandpass, being low-level relative to the terms of interest in FIGS. 4a, 4b and 4c, are susceptible to thresholding.

Because the discrete Fourier transform terms for spatial frequencies for a given fingerprint region are relatively few, the effects of non-fingerprint or non-regular source contributions to such terms can be attenuated by a "scoring" technique, contrived to discriminate in terms of that predominant discrete frequency ($f_1$) having the highest energy level ($e_1$). Such scoring system will attenuate the energy term ($e_i$) for other than the largest discrete Fourier term by a factor ($d_{1i}^4$) corresponding to the reciprocal of the square or other function of the spectral interval between the predominant frequency energy term $e_1$ and the energy terms ($e_i$) for such other discrete Fourier terms. For at least two such other terms (i.e., three predominant terms):

$$E = e_1 + e_2/d_{12}^2 + e_3/d_{13}^2. \tag{1}$$

In this way, the energy contributed by randomly present discrete frequencies within the spatial spectrum of interest is attenuated and the score, E, tends to approach the value of $e_1$. The score E may then be further tested by thresholding as an indication of the confidence level with which such term indicates the presence of a fingerprint-like region (high-level thresholding) or, conversely, the presence of a non-fingerprint-like region (null or low-level thresholding).

Figure 7:
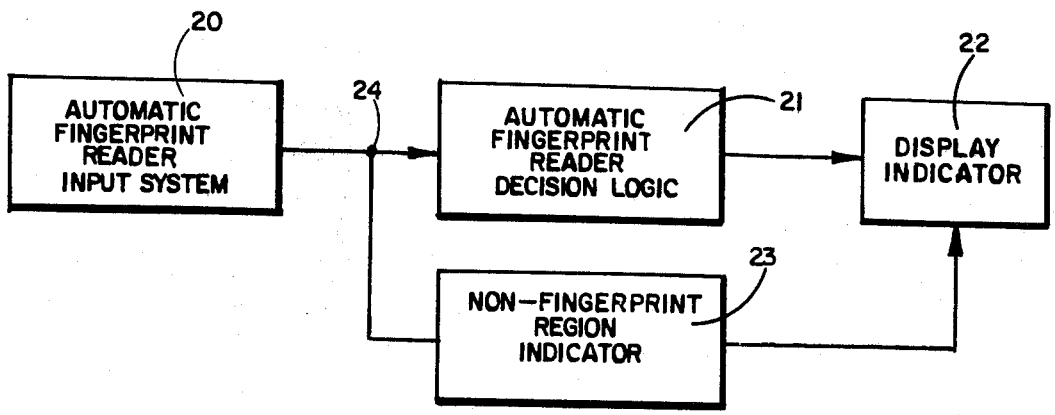
FIG. 7 is a block diagram of a system in which the concept of the invention may be advantageously employed.

A system in which the concept of the invention may be advantageously employed is shown in FIG. 7.

Referring now to FIG. 7, there is illustrated in block diagram form an automatic fingerprint reader system comprising an input section 20, decision logic section 21, and display indicator 22. Input section 20 includes electro-optic means for converting an image or optical impression into a series of grey-coded electrical signals which are applied to the decision logic 21 for a determination as to whether the image may include fingerprint data of interest, while utilization means 22 displays the machine decision in that regard. Alternatively, block element 22 may comprise fingerprint classifier and comparator means.

There is further provided in the arrangement of FIG. 7 non-fingerprint-like region indicator means 23, responsive to the output 24 of signalling device 20, for "weighting", gating or otherwise modulating the output of display indicator 22 in accordance with the concept of the invention. In other words, element 23 provides a control signal output indicative of the occurrance of a non-fingerprint-like region in the review of the regions of a fingerprint image of interest, for the purpose of preventing spurious image non-match decisions based on processing of irrelevant image data.

Figure 8:
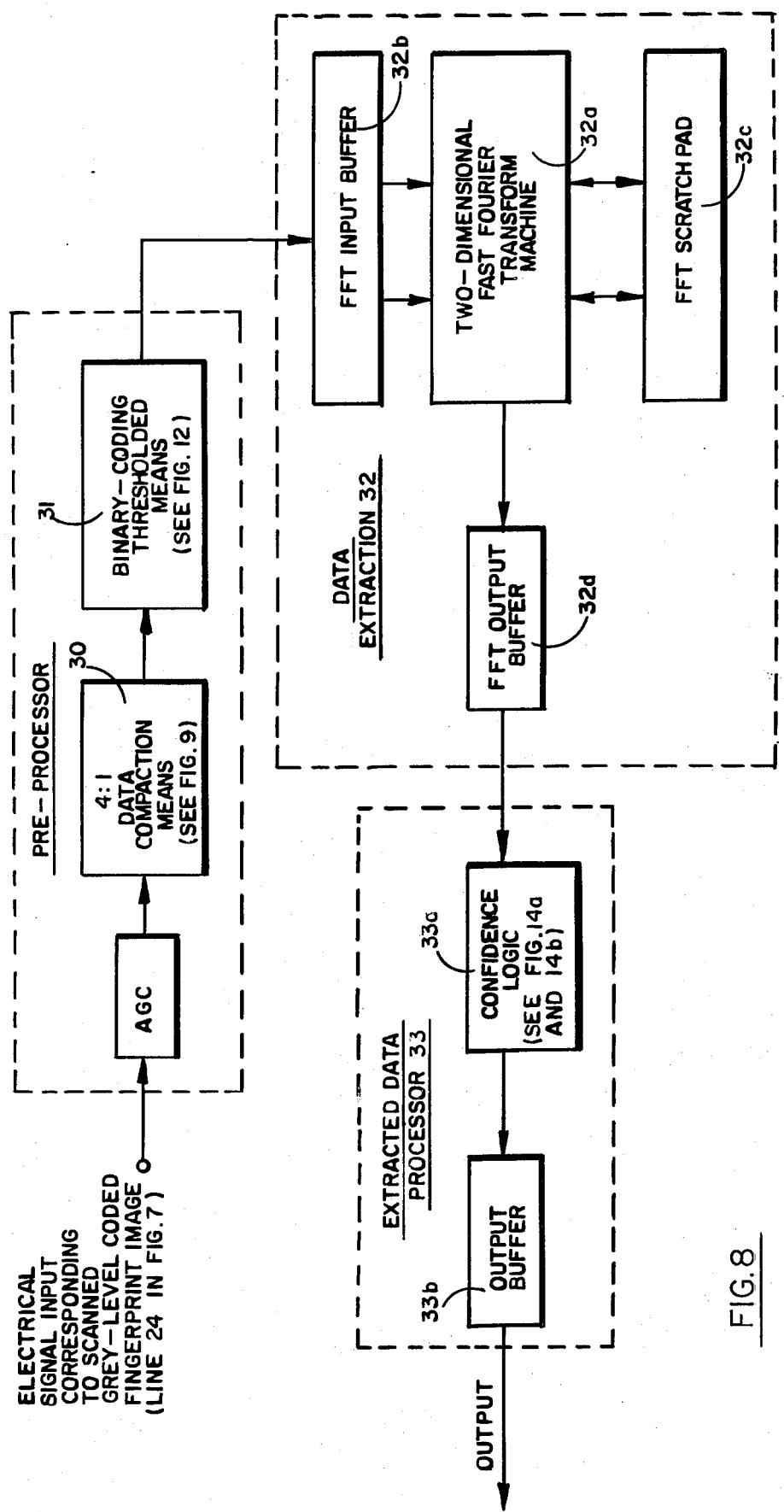
FIG. 8 is a block diagram of a system embodying the concept of the invention.

The device of block 23, embodying the concept of the invention, is shown in further detail in FIG. 8.

Referring now to FIG. 8, there is illustrated a block diagram of a system embodying the concept of the invention. There is provided data compaction means 30 responsive to a "grey-coded" pixel image signal output of the sensor or input stage of an automatic fingerprint reader system. Such "grey-coded" signal represents a scanned image as a matrix of grey-coded pixels or discrete elements of a mosaic or pattern corresponding to the pattern of interest. The data density of the signal of interest is greater than that required for the non-fingerprint indicator function of the invention. Accordingly, to unnecessarily cope with such data density would merely slow-down the data processing function or require unnecessary data processing capacity, neither of which is desirable. Therefore, 4:1 data compaction of the grey-coded data is provided by means of element 30, whereby an image of 32×32 pixels is reduced in definition or resolution to an image of 16×16 pixels. In other words, a 4-pixel cluster of 2×2 pixels is supplanted by a single grey-coded pixel, the code or intensity of which is the average of those pixels being supplanted. Such compaction technique is also useful in interfacing the data input source with the fast Fourier transform device 32 to be employed for spatial frequency analysis of the input data. Such interfacing or scaling may be selected to overlap the sub-areas or regions utilized by other testing or data pre-editing schemes, so that the editing function provided thereby may be supplemental to that provided by such other testing schemes for such regions.

If deemed desirable, an AGC function may be interposed at the input to data compaction means 30, in accordance, for example, with the teachings of U.S. Application Ser. No. 934,657 for SYSTEM FOR EXPANDING THE VIDEO CONTRAST OF AN IMAGE, filed Aug. 17, 1978, by Stanley A. White, assignor to Rockwell International Corporation, assignee of the subject application. However, signal normalization within the fingerprint reader input system (i.e., element 20 in FIG. 1) may obviate any necessity for such additional function.

Because the fast Fourier analyzer 32 in the arrangement of FIG. 8 employs binary-coded (i.e., black-white coded) data, there is interposed between the output of data compaction means 30 and fast Fourier transform device 32 binary-coding means 31. Binary coder 31 functions as an adaptive threshold device to threshold each of the (compacted) grey-coded pixels within each discrete region (of 16×16 pixels) comprising the pattern field of interest, at a threshold level corresponding to the median value grey-code for the the 256 pixels within such region. The result is a binary-coded image of 16×16 pixels representing a 64×64 mil² region, the image definition of which is affected only by the changes in contrast within the region and which is unaffected by the general lightness or darkness of such region and corresponding, say, to the image pattern regions depicted in FIGS. 1a, 2a, 3a, 4a or 5a.

The binary-coded 16×16 pixel output of thresholding means 31 is applied to the input of a 16×16 element, two-dimensional fast Fourier transform machine (2D-FFT) 32. 2D-FFT 32 serves to scan or analyze the data frame (for each region of the image field of interest) in two mutually orthogonal directions (corresponding to, say, horizontal and vertical directions of the pattern region in FIG. 1a) to develop or extract discrete Fourier terms for each frequency of the preselected range of discrete frequencies (i.e., 2–5 cycles per 64 mil frame size). Such limited bandpass is achieved by merely omitting use of the output taps for Fourier terms corresponding to discrete frequencies outside (i.e., above and below) such preselected bandwidth.

The organization of data extraction means 32, as illustrated in FIG. 8 may be comprised of a fast Fourier transform 32a, input-coupled to the output of binary coding means 31 by means of a buffer 32b, and employing a scratch pad memory 32c. The output of element 32a may also include an output buffer 32d.

Figure 13:
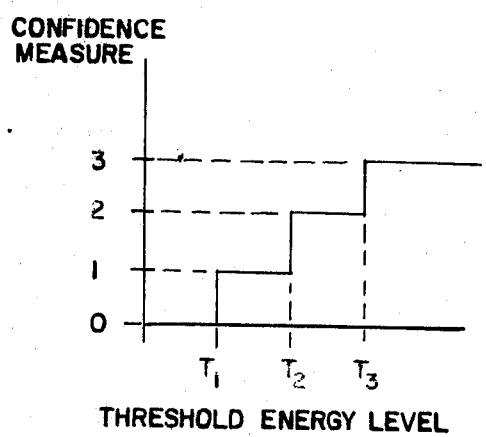
FIG. 13 is a responsive diagram, illustrating the four-state, three-level thresholded response of the logic device 33 of FIG. 8.

The output of data extraction means 32, representing the discrete Fourier energy-versus-discrete frequency terms extracted from the binary-coded image pattern, is fed to means 33 for processing the extracted data. Such extracted data processing means comprises confidence logic 33a for implementing the "scoring" or confidence expression of Equation (1) above and also multi- (three-) level thresholding means for presenting such score as a four-level (two-bit) binary coded representation (i.e., 0, 1, 2 or 3, as shown in FIG. 13). The output signal of logic 33a may be buffered by buffer means 33b, if desired, for appropriate interfacing with output signal utilization means (not shown).

The construction, arrangement and utilization of signal buffering means for purposes of interfacing between various functionally-cooperating digital equipments is well-understood in the art and does not constitute a novel aspect of the disclosed invention. Accordingly, elements 32b, 32d and 33b are shown in block form only for convenience in exposition.

Figure 9:
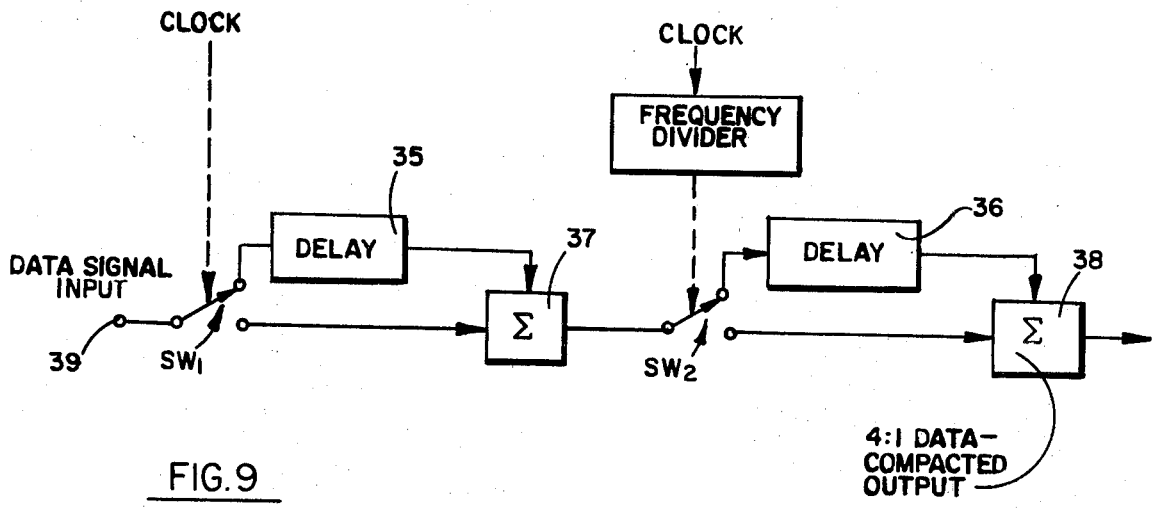
FIG. 9 is a schematic arrangement, partially in block form, of an exemplary mechanization for the data compaction block element included in FIG. 8.
Figure 10:
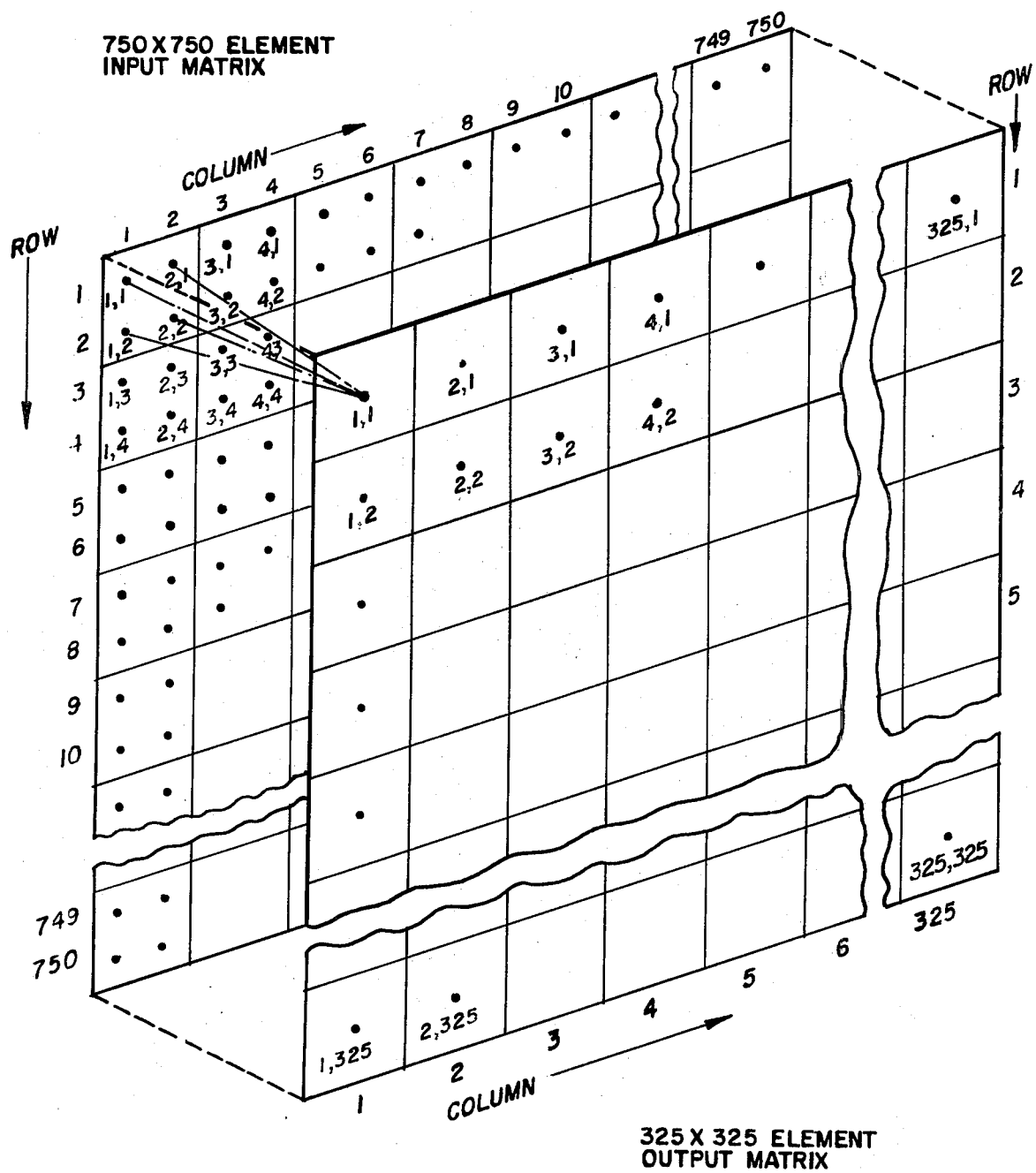
FIG. 10 is an illustration of an exemplary compaction of a representative pixel pattern, as performed by the device of FIG. 9.
Figure 11:
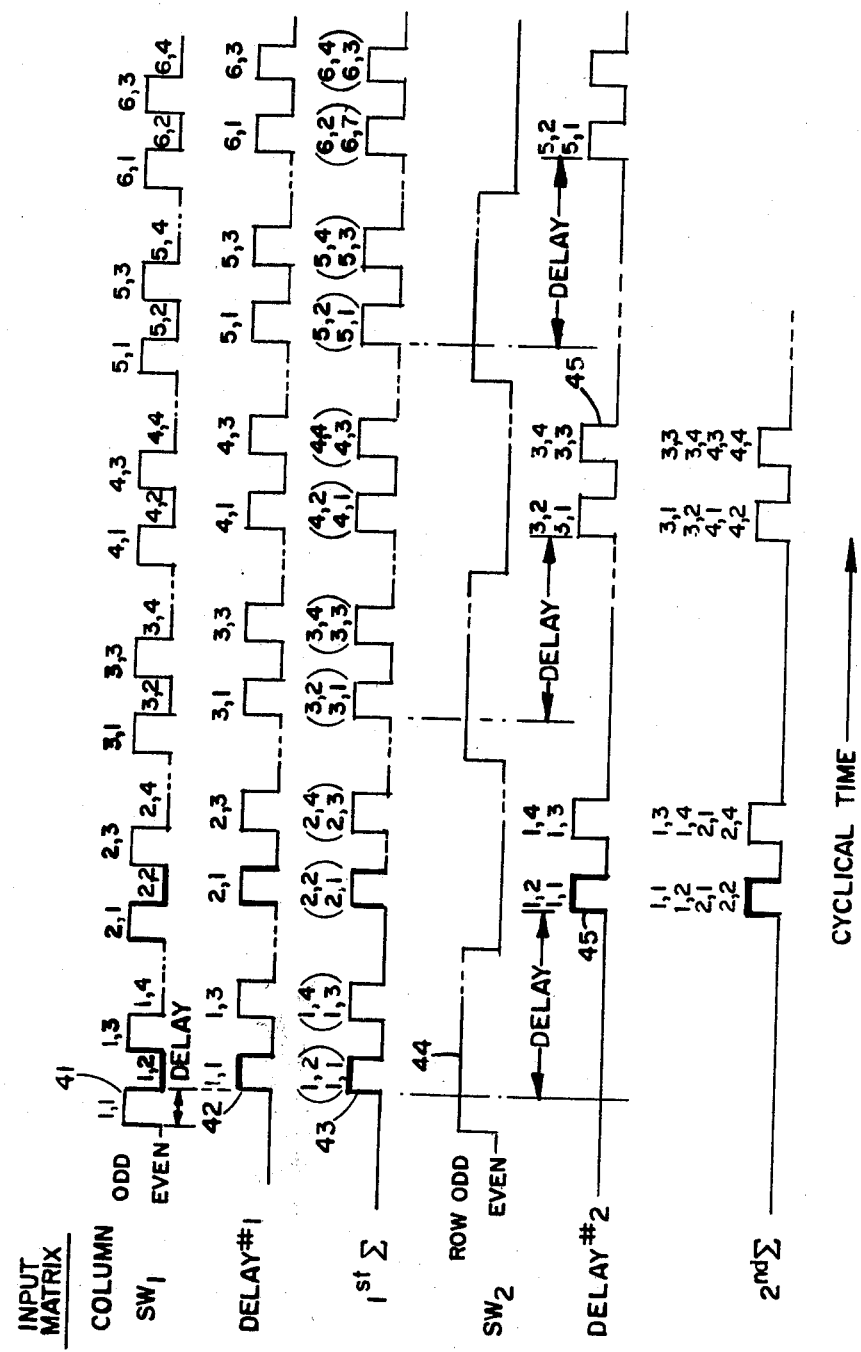
FIG. 11 is a timing diagram for the device of FIG. 9.

The construction, arrangement and cooperation of data compaction means 30 is explained in further detail by means of FIGS. 9, 10 and 11.

Referring now to FIG. 9, there is illustrated in block diagram form, data compaction means 30 of FIG. 1. There are provided a pair of clocked, double-throw switches $SW_1$ and $SW_2$, a pair of delay elements 35 and 36, and a pair of digital summers 37 and 38.

An armature terminal 39 of first digital switch means $SW_1$ comprises an input terminal responsive to, say, a 4-bit input signal, the signal representing the scanning of a pattern of grey-coded pixels corresponding to a matrix of 750×750 elements (shown in FIG. 10). First switch $SW_1$ is operated at the clock rate at which such matrix is scanned and in synchronism with the scanning of successive elements in a given row (or a given element in successive columns) of the matrix, being in a mutually exclusive one of alternate states for odd and even columns, respectively. As illustrated, in a first state switch $SW_1$ is connected to an input of first delay 35, and (in a second switched state) is connected to an input of digital summer 37. Digital summer 37 is further responsively coupled to an output of delay means 35. An armature terminal 40 of second switch $SW_2$ is coupled to the output of first summer 37, while second delay 36 and second summer 38 are arranged to cooperate with second switch $SW_2$ in like manner as the cooperation among elements 35 and 37 with element $SW_1$. Second switch $SW_2$ is operated at the reduced clock rate at which successive elements in a given column are sequentially scanned, corresponding to the rate at which successive rows of the input matrix is sequentially scanned and in synchronism therewith. Such reduced clock rate corresponds to the reciprocal of the interval of time required to successively scan each of the elements or pixels of a given column. The means of clocking switches $SW_2$ and $SW_2$ is well understood in the prior art and does not constitute a novel aspect of the invention and are therefore not shown in further detail.

Each of delay elements 35 and 36 may be comprised of prior art clocked shift registers, the delay provided by first delay means 35 corresponding to one-half the switching periodicity or reciprocal of the switching frequency of associated switch $SW_1$. In other words, the time delay provided by element 35 is equal to one-half the interval for switch $SW_1$ to switch from one state to the second state, from the second state to the first state, and back to the second state. Similarly, second delay means 36 provides a time delay corresponding to one-half the periodicity of associated switch $SW_2$.

In normal operation of the arrangement of FIG. 9, switch $SW_1$ applies the 4-bit pixel data of odd numbered columns of pixels (of an exemplary 750×750 matrix in FIG. 10) to delay means 35 and the pixel data of even numbered columns to digital summer 37, such cyclically alternate status of switch $SW_1$ being illustrated by curve 41 on FIG. 11. Thus, for input data representing a scanning of sequential pixels of row 1, first pixel (1,1) and second pixel (1,2) of FIG. 10 are presented on successive alternate states of switch $SW_1$, grey-coded amplitude data for pixel (1,1) being fed to delay element 35 and the amplitude data for the next pixel (1,2) being subsequently fed directly to digital summer 37.

First delay means 35 delays the data of first pixel (1,1) by an amount corresponding to one pixel data period (curve 42 in FIG. 11), as to make such delayed data coincident with the $SW_1$ sample time for the second pixel (1,2) on curve 41. The combining of the amplitude data for pixels (1,1) and (1,2) is thus effected by means of digital summer 35 (curve 43 in FIG. 11).

The cooperation among elements $SW_2$, 36 and 38 is similar to that of elements $SW_1$, 35 and 37, whereby adjacent sets of pixel pairs are combined to complete the 4:1 data compaction process. Switch $SW_2$ (in FIG. 9) applies the pixel amplitude data for odd rows (of the first or input matrix in FIG. 10) to second delay means 36 and that for even rows directly to digital summer 38, such cyclical alternate state of switch $SW_2$ being illustrated by curve 44 in FIG. 11. Thus, for input data representing a scanning of sequential pixels of row 1 (i.e., combined pixel pairs ((1,1) (1,2)) and successive pixel pairs ((1,3) (1,4)), etc. for row 1 of the input matrix in FIG. 10) are applied to delay means 36. The pixel pairs (2,1) (2,2) and successive pixel pairs (2,3) (2,4) of input matrix row 2 are applied to the input of summer 38.

Second delay means 36 delays the data of each combined first column or vertical pixel pair (1,1) (1,2) and (1,3) (1,4) by an amount corresponding to one row scan period (curve 45 at (1,1) (1,2) in FIG. 11), as to make such delayed odd-row data coincident with the SW$_2$ sample time for the successive even-numbered row of combined pixel data (curve 43 at (2,1) (2,2) in FIG. 11). The combining of the amplitude data for the cluster of four pixels (1,1), (1,2), (2,1) and (2,2) of the input matrix of FIG. 10 is thus effected by means of digital summer 38, resulting in an output pixel (1,1) of the output matrix of FIG. 10. In similar fashion, the data for the four input pixels (1,3), (1,4), (2,3) and (2,4) is combined to provide a single output pixel (1,2), the second pixel in column 1 of the output matrix of FIG. 1. Upon subsequent completion of column 1 of the output matrix, the pixel amplitude data for columns 3 and 4 of the input matrix of FIG. 10 are processed to form column 2 of the output matrix. Input pixels (3,1) and (4,1) of curve 41 (FIG. 11) are delayed (at curve 42) and combined with a respective one of input pixels (3,2) and (4,2) at curve 43 (FIG. 11). Duo-pixel (3,1) (3,2) is delayed (at curve 45 in FIG. 11) and then combined with duo-pixel (4,1) (4,2) at curve 46 to provide the output pixel (2,1) in the output matrix of FIG. 10. In like fashion the amplitudes of input pixels (3,3), (3,4), (4,3) and (4,4) are combined to form the amplitude of output pixel (2,2). Thus, it is to be appreciated that the output matrix of FIG. 10 represents a 2×2 or 4:1 data compaction of the of the input matrix of FIG. 10, and that the arrangement of FIG. 9 cooperates to provide such 4:1 data compaction.

Although the amplitude of each grey-coded output pixel of the output matrix of FIG. 10 has been described in terms of the amplitude sum of the grey-coded input pixels, it is clear that such sum may be scaled (by an attenuation factor of 4) to restore the scaling of the input signal. Also, while combining (and scaling) of the input amplitudes has been described as an averaging technique, it is clear that median values may be employed from among the grey-code utilized, as is well understood in the art.

Figure 12:
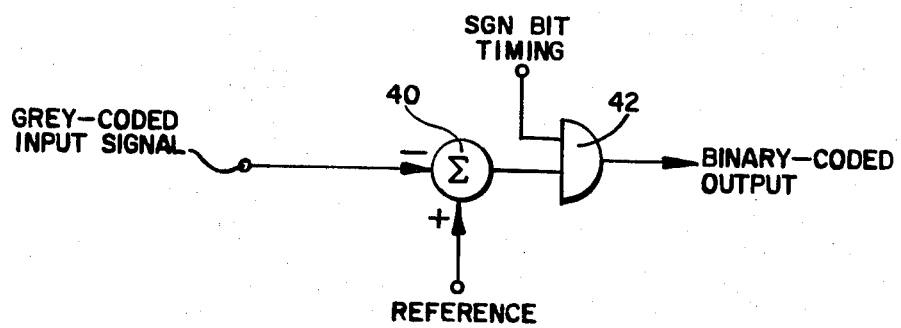
FIG. 12 is a schematic arrangement, partially in block form, of the binary-coding thresholded signalling block of FIG. 8.

The data-compacted, grey-coded output matrix of FIG. 10 is next binary-coded prior to being subjected to the fast Fourier transform extraction process, as shown in further detail in FIG. 12.

Referring now to FIG. 12, there is illustrated in further detail the binary-coding means 31 of FIG. 8. There is provided differential signalling means 40 responsive to the compacted data matrix signal output of element 30 (in FIG. 8) and further responsive to a preselected reference signal amplitude for providing an output signal indicative of the difference between the applied inputs thereto. Such differential signalling means may comprise a difference amplifier responsive to two signals of like polarity for providing an output indicative of the sense of the difference therebetween. Alternatively, a signal summing amplifier may be employed and the applied sense of the threshold reference signal selected to be opposed to the polarity of the applied grey-coded data signal, whereby the sense of the output is indicative of whether or not the signal amplitude exceeds the preselected threshold value. The value of such threshold is nominally selected to be one-half of the grey-coded amplitude range. A coincidence, or AND, gate 42 responsive to the output of element 40 and to a sign bit timing pulse or clock, provides a "1" state output upon the coincidence of the timing pulse and a signal amplitude state in excess of the threshold; otherwise a "0" state output occurs at gate 42. Accordingly, the arrangement of FIG. 12 cooperates to convert an applied grey-coded input to a binary-coded output.

Figure 6:
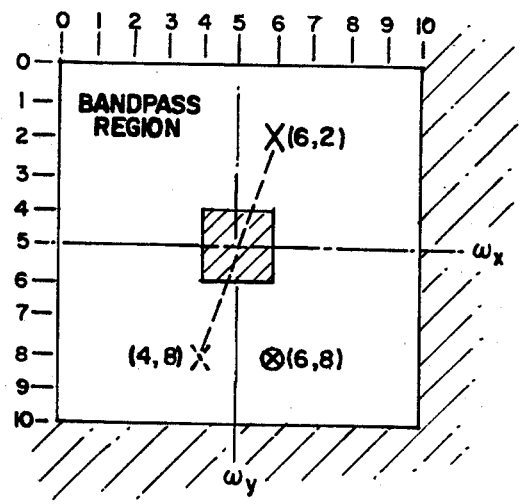
FIG. 6 is a representation of the bandpass limited Fourier transform response region of interest.

The binary-coded output of element 31 (in FIG. 8) is applied as an input to the fast Fourier transform machine 32a of FIG. 8, which machine extracts for preselected discrete (spatial) frequencies the Fourier power or energy terms for each of two mutually orthogonal directions. For example, in each of the x and y axes of a data frame (or selected region of an image field of interest) a predominant frequency term ($\mp\omega_{x1}$ and $\mp\omega_{y1}$) may exist. In the two-dimensional discrete frequency plane representation of FIG. 6 such data may plot as two points ($+w_1$, $+y_1$) and ($-w_1$, $-y_1$). As illustrated in FIG. 6, the distance between each discrete point in the direction of either axis represents a frequency interval of 1 cycle per frame, the two regions (0, to $\mp 1$ cycles per frame) and (6 cycles per frame and above) being masked. In other words, the unmasked region corresponds to the discrete frequencies:

$\mp\omega_x = 2-5$ cycles per frame $\mp\omega_y = 2-5$ cycles per frame.

Thus, it is to be appreciated that the discrete output terminals of data extraction means 32 corresponds to the continuous frequency plane in an analog optical Fourier processor, while the use of only a preselected plurality of adjacent taps for bandpass filtering corresponds to the optical masking employed with such optical techniques. Such optical techniques of displaying a bandpass limited (continuous) Fourier transform of a time domain signal is discussed in the work of Cutrona (See, for example, the article "On the Application of Coherent Optical Processing Techniques to Synthetic Aperture Radar", by L. J. Cutrona, et al, at pages 1026 et seq. Proceedings of the IEEE, Vol. 54, No. 8, August 1966). A further discussion of the frequency plane of an optical system for processing time domain data corresponding to a spatial line image is presented in U.S. Pat. No. 3,545,841 issued to M. J. Dentino et al for Non-Scanning Optical Processor for Display of Video Signals. FIG. 4b of such U.S. patent shows a plus and minus modulation frequency component ($+\omega_{s1}$ and $-\omega_{s1}$) displayed in the (optical) frequency plane. While such optical techniques as applied to continuous Fourier transform tend to be limited to one-dimensional Fourier transforms, two-dimensional fast Fourier transform machines for discrete Fourier transform processing digital electronic data signals are well understood in the digital systems art. See, for example, the discussion at pages 240 and 241 in the article "What is the Fast Fourier Transform?" by W. T. Cochran et al in the volume, Digital Signal Processing, edited by Rabiner and Rader, (pp 240–250), published by the IEEE Press (1972), which article describes the solution speeds achieved in the operation of an IBM 7094 computer for such purposes. Such 1972 reference volume also includes (at pages 263, et seq. thereof) the article "A Method for Computing the Fast Fourier Transform with Auxiliary Memory and Limited High Speed Storage" by Richard C. Singleton, which reference (at page 264 thereof) discusses not only the earlier use of the IBM 7094 but also the alternate use of the Burroughs B5500 for high speed computation of the fast Fourier transform. The article "An Algorithm for computing the Mixed Radix Fast Fourier Transform", by Richard C. Singleton, included at pages 294, et. seq. of the above-noted IEEE Press reference, describes in an Appendix I a FORTRAN program used on CDC 6400, CDC 6600, IBM 360/67, and Burroughs B5500 machines for such computations. Other references are included in such volume and also listed in the bibliography accompanying the reference articles published therein. A further reference to the prior art of FFT machines is included in U.S. Pat. No. 3,748,451 to L. D. Ingwersen for General Purpose Matrix Processor with Convolution Capabilities, particularly Columns 1, 2 and 3 thereof.

Accordingly, the availability and use of commercially available machines for two-dimensional fast Fourier transform computation of discrete Fourier transforms is sufficiently well-known and understood in the art, as to obviate further exposition of the structure and means employed for such purpose. Therefore, element 32b is shown in block form in FIG. 8 for convenience only in exposition.

The output of the fast Fourier transform machine 32 will appear on a number of output lines, the frame time coincidence of the data on such lines representing a data set for a given data point in the two-dimensional matrix of FIG. 6: A discrete frequency in each of the two frequency coordinates ($\mp\omega_x$, $\mp\omega_y$) and an associated power or energy level ($e_i$). Such energy level for each discrete two-dimensional frequency point or data set is then processed by a system of comparators to determine the predominant data set, or data set having the predominant energy level, designated at $e_i$ in Equation (1), above. Such a system of comparators is shown in FIG. 14a.

Figure 14A:
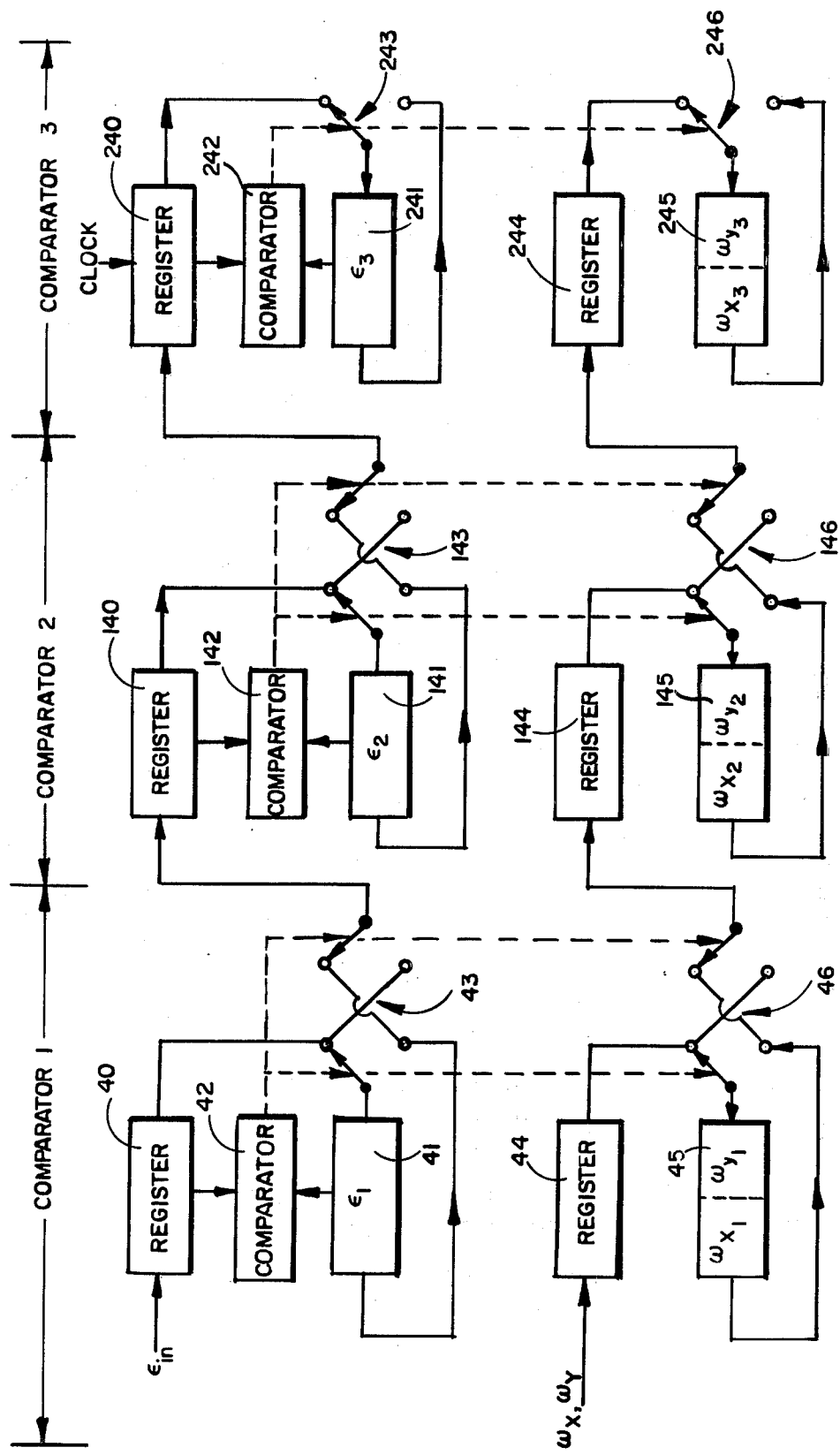
FIGS. 14a and 14b are a schematic arrangement, partially in block form, of the "scoring" or confidence logic block of FIG. 8.
Figure 14B:
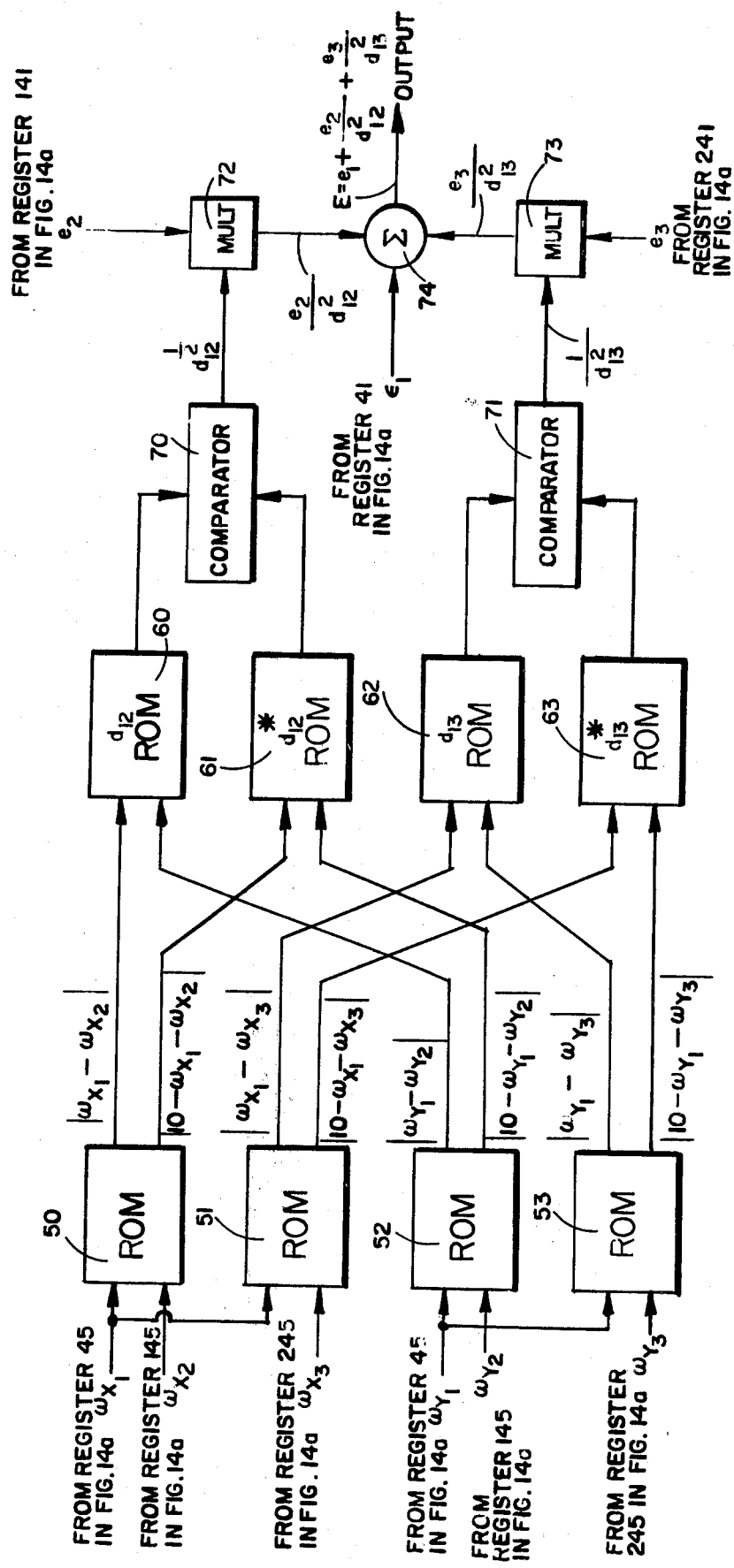

Referring now to FIGS. 14a and 14b there is illustrated in further detail an exemplary mechanization of the extracted data processor 33 of FIG. 8. FIG. 14a schematically depicts in block diagram form the logic for determining the data sets for the predominant energy term $e_1$, and the next two most predominant terms $e_2$ and $e_3$ of Equation (1), together with the associated two-dimensional frequency coordinates ($\omega_x$, $\omega_y$) associated therewith, while FIG. 14b depicts the mechanization of the term E of Equation (1), from a determination of the frequency spacings between the predominant data set and the other two relevant data sets and from the energy levels associated with each such data set.

In the arrangement of FIG. 14a there are provided three systems of comparators, each cooperating in the manner of a peak detector. The first comparator system is comprised of an input register 40 responsive to the eight-bit output of the 2D-FFT 32 (of FIG. 8), a one-word data storage means 41, a comparator 42 and double-pole, double throw switching means 43. Such first comparator system further includes associative address storage means comprising a second register 44, second storage means 45 and second double-pole, double-throw switching means 46. Thus, elements 40 and 44 serve as register means to temporarily store a current discrete Fourier term sample (e) and the associated two-dimensional frequency address therefor ($\omega_x$, $\omega_y$); storage elements 41 and 45 serve to temporarily store a previous data sample and the associated address therefor; and comparator 42 serves to compare the current Fourier sample in register 40 with the stored earlier sample in storage means 41. If the current sample in register 40 is greater than the earlier sample in storage means 41, the two-state output of comparator 42 serves as a logic control signal to switch switching means 43 and 46 as shown in FIG. 14a, whereby a clocking-out of registers 40 and 44 and storage means 41 and 45 causes the previous data sample in storage 41 and its corresponding address in storage 45 to be transmitted to a further set of registers 141 and 144. The greater valued current data sample and its associated address (in being clocked out of registers 40 and 44, respectively) are transmitted to and substituted in storage means 41 and 45, respectively.

Where, however, a previous sample, stored in storage 41, is greater than the current data sample (in register 40), then comparator 42 serves to switch switching means to an alternative state, whereby the previous sample and associated address remain in storage means 41 and 45, and the comparatively lesser current data sample in register 40 and the associated address in register 44 are discarded to registers 141 and 145 (in FIG. 14a).

Hence, in discarding the lesser of a current and a previous data sample, while storing the larger of the two, the arrangement and cooperation of comparator 42 is seen to function as a peak detector for the detection of the term $e_1$ of Equation (1).

There is also provided in FIG. 14a elements 141, 142, 143, 144, 145 and 146 forming a second comparator and comprised of like functional elements as the first comparator and similarly functioning as a second peak detector responsive to the discards of the first peak detector for detecting peak values ($e_2$) less than those detected by such first peak detector, together with the associated two-dimensional frequency address of such second highest peak value. There is further provided the combination of elements 241, 242, 243, 244, 245 and 246, all cooperating as a third comparator and comprised of like functional elements as the first and second comparator, and functioning as a third peak detector. Such third peak detector is responsive to the discards of the second peak detector to detect peak values ($e_3$) less than those detected by either of the first and second peak detectors ($e_3 < e_2 < e_1$) and similarly discarding all other data samples.

Because the construction, arrangement, clocking and cooperation of digital registers storage means, comparators and switching means are well understood in the art, these elements are shown schematically or in block form only, for purposes of convenience in exposition in FIG. 14a. Although an exemplary mode of successive peak detection has been shown, any one of alternative schemes occurring to mind may be employed.

Although the address registers 44, 144 and 244 and the address storage means 45, 145 and 245 have each been illustrated as single signal line input and outputs, it is to be understood that parallel data processing may be preferably employed, whereby such single paths may represent a plurality of parallel signalling lines, a set for $\omega_x$ signals and a separate set for $\omega_y$ signals (as more clearly indicated in FIG. 14b).

The three predominant Fourier terms (of Equation (1)), and the associated two-dimensional frequency addresses therefor having been determined, the frequency spacing or increment terms $d_{1j}^{\frac{1}{2}}$ and may then be determined and applied, and several product terms combined, to effect the score, E, of Equation (1) by means of the exemplary arrangement of FIG. 14b.

Referring now to FIG. 14b, there is provided first read-only memory means (ROM's) 50, 51, 52, and 53, second read-only memory means (ROM's) 60, 61, 62 and 63, first and second comparators 70 and 71, first and second multipliers 72 and 73, and signal combining means 74.

The function of ROM's 50, 51, 52, 53, 60, 61, 62 and 63 in FIG. 14b is to determine alternative values for $d_{12}^{\frac{1}{2}}$ and $d_{13}^{\frac{1}{2}}$ of Equation (1), from the frequency-spacings between the maximum energy term $e_1$ and each of the next most prominent energy terms $e_2$ and $e_3$, $$d_{1i}^2 = \Delta\omega_{xi}^2 + \Delta\omega_{yi}^2$$

$$d_{1i}^2 = |\omega_{x1} - \omega_{xi}|^2 + |\omega_{y1} - \omega_{yi}|^2$$

Alternative values of the frequency spacing intervals $d_{1i}$ are determined by alternatively employing the mirror frequency values of the dominant Fourier energy terms, to be explained more fully hereinafter. The reciprocals of the alternative values are compared by comparator means and the larger of the reciprocal values is selected, the output $d_{12}^{\frac{1}{2}}$ appearing on the output line of comparator 70 and the output $d_{13}^{\frac{1}{2}}$ appearing on the output line of comparator 71. Multiplier 72 gain scales or multiplies the $e_2$ signal (from register 142 in FIG. 14a) to provide the product $e_2/d_{12}^2$, corresponding to the second term in the right hand member of Equation (1). Multiplier 73 similarly gain-scales or multiplies the $e_3$ signal (from register 242 in FIG. 14a) to provide the product $e_3/d_{13}^2$, corresponding to the third term in the right hand member of Equation (1). Combining means 74 serves to combine the output $e_1$ (from register 42 in FIG. 14a) and the outputs of multipliers 72 and 73 so as to complete the mechanization of Equation (1).

The determination of the terms $d_{12}^{\frac{1}{2}}$ and $d_{13}^{\frac{1}{2}}$ by means of the ROM's (read only memories) of FIG. 14b involves using or testing the proximate one of a mirror, or conjugate, set of frequencies for the sets of coordinate frequency addresses recorded in registers 45, 145 and 245. In other words a lesser spatial frequency difference between the proximate Fourier energy term may occur between a so-called "positive" frequency set of one term and "negative" frequency set of another term. For example, the spatial frequency difference between a frequency address or set $(\omega_{x1}, \omega_{y1})$ for the first one of the three predominent discrete Fourier energy terms (say, $e_1$) and a mirror frequency address (i.e., $-\omega_{x2}, -\omega_{y2}$) for $e_2$, the second of the predominent energy terms may be the least difference, and therefore such lesser spacing between such mirror frequency term and the principal term would be employed in mechanizing Equation (1).

For simplification and convenience in the determination of the (closest) spacing between the frequency address of the principal term ($e_1$) and the (mirror) frequency address of the lesser prominent term, several additional structural and functional features are included in the disclosed embodiment. First, all frequency addresses (including mirror frequencies) are re-coded as positive numbers, beginning with the upper left hand corner in the frequency address grid illustrated in FIG. 6. Thus:

$$(\omega_{x-5}, \omega_{y-5}) = (0,0)$$

$$(\omega_{x+5}, \omega_{y+5}) = (10,10)$$

Accordingly:

$$\omega_{xi}, \omega_{yi} = (\omega_{xi}+5), (\omega_{yi}+5).$$

In this way, only differences between positive numbers are involved in determining the frequency spacings $d_{12}$ and $d_{13}$. This re-coding may be done in a scratch pad memory 32c, ancillary to the FFT output buffer in FIG. 8. In practice, the actual mirror frequency terms of the FFT analysis are not placed in memory in the embodiment of FIG. 8. Instead, such mirror image address terms are synthesized by ROM's 50, 51, 52 and 53 (in FIG. 14b), employing the re-coded frequency address outputs from FFT buffer 32d (of FIG. 8). In this way, the amount of buffer storage required is reduced. For example, an address for first term $e_1$ ($\omega_{x1} = +1$ cycle/frame, $\omega_{y1} = +3$ cycle/frame), and an address for a second term $e_2$ ($\omega_{x2} = +1$ cycle/frame, $\omega_{y2} = -3$ cycle/frame) are recorded in FFT scratch pad memory 32c as:

$$\omega_{x1}, \omega_{y1} = (1+5), (5-3) = (6,2)$$

$$\omega_{x2}, \omega_{y2} = (1+5), (5-(-3)) + (6,8)$$

$$\Delta\omega_{x12} = |6-6| = 0$$

$$\Delta\omega_{y12} = |2-8| = 6$$

$$d_{12} = \Delta\omega_{12} = 6.$$

Such situation may be appreciated from observation of the situation illustrated in FIG. 6.

By treating the mirror image of the first term, $e_1$, a different (lesser) spacing frequency results:

$$(\omega_{x1}, \omega_{y1})^* = (-1+5), (5-(-3)) = (4,8)$$

$$(\omega_{x2}, \omega_{y2}) = (1+5), (5-(-3)) = (6,8)$$

$$\Delta\omega_{x12}^* = |4-6| = 2$$

$$\Delta\omega_{y12}^* = |8-8| = 0$$

$$d_{12}^* = \Delta\omega_{12}^* = 2.$$

Such alternate situation may also be appreciated from inspection of FIG. 6. In can also be shown that the quantity $d_{12}^*$ can be alternatively computed or determined as:

$$d_{12}^* = |10 - \omega_{x1} - \omega_{x2}| = |10 - 6 - 8| = 2.$$

More generally:

$$d_{12}^2 = |\omega_{x1} - \omega_{x2}|^2 + |\omega_{y1} - \omega_{y2}|^2 = \Delta\omega_{x12}^2 + \Delta\omega_{y12}^2$$

$$(d_{12}^*)^2 = |10 - \omega_{x1} - \omega_{x2}|^2 + |10 - \omega_{y1} - \omega_{y2}|^2.$$

In other words, the components of $d_{1i}$ are the coordinate differences between a pair of coordinate sets, and the components of $d_{1i}^*$ are the 10's complements of the sums of corresponding coordinates of a pair of coordinate sets.

In the arrangement of FIG. 14b, ROM's, 50, 51, 52 and 53 each provide dual outputs, corresponding to the coordinate differences and the 10's complement of the sums of corresponding coordinates of a pair of coordinate sets. ROM's 50 and 52 provide the data for $d_{12}$ and $d_{12}^*$, while ROM's 51 and 53 provide the data for $d_{13}$ and $d_{13}^*$. ROM 50 is responsive to the $\omega_{x1}$ and $\omega_{x2}$ outputs of registers 45 and 145 respectively (of FIG. 14a) as addressing means to provide (i.e., look-up) the two outputs $|\omega_{x1} - \omega_{x2}|$ and $|10 - \omega_{x1} - \omega_{x2}|$. ROM 52 is responsive to the $\omega_{y1}$ and $\omega_{y2}$ outputs of registers 45 and 145 to provide the two outputs $|\omega_{y1} - \omega_{y2}|$ and $|10 - \omega_{y1} - \omega_{y2}|$. Similarly, ROM's 51 and 52 are responsive to the outputs of registers 45 and 245 as addressing means to provide appropriate outputs, ROM 51 providing the two outputs $|\omega_{x1} - \omega_{x3}|$ and $|10 - \omega_{x1} - \omega_{x3}|$, and ROM 53 providing the outputs $|\omega_{y1} - \omega_{y3}|$ and $|10 - \omega_{y1} - \omega_{y3}|$. In other words ROM's 50 and 52 provide the components in a determination of the spacing frequency $d_{12}$ or $d_{12}*$, and ROM's 51 and 53 provide the components for a determination of $d_{13}$ or $d_{13}*$.

ROM's 60, 61, 62 and 63 in FIG. 14b determine (or look-up) functions of the spacing terms $d_{12}$, $d_{12}*$, $d_{13}$ and $d_{13}*$, respectively in response to an appropriate respective address. For example, ROM 60 is responsive to the differential outputs of ROM's 50 and 52 to provide an output $d_{12}{}^{-2}$ corresponding to the reciprocal of the terms of the squares of the applied inputs to ROM 60:

$$d_{12}{}^{-2} = [|\omega_{x1} - \omega_{x2}|^2 + |\omega_{y1} - \omega_{y2}|^2]^{-1}.$$

ROM 61 is responsive to the 10's complement summed outputs of ROM's 50 and 52 to provide an output $(d_{12}*)^{-2}$ corresponding to the reciprocal of the squares of the applied inputs:

$$(d_{12}*)^{-2} = [|10 - \omega_{x1} - \omega_{x2}|^2 + |10 - \omega_{y1} - \omega_{y2}|^2]^{-1}.$$

The respective reciprocal terms $d_{12}{}^{-2}$ and $(d_{12}*)^{-2}$ from ROM's 60 and 61, respectively, are then applied to comparator 70 for a determination of the greater of them (corresponding to a least spacing interval).

Similarly, ROM 62 is responsive to the differential outputs of ROM's 51 and 53 to provide an output $d_{13}{}^{-2}$ corresponding to the reciprocal of the sums of the squares of the applied inputs to ROM 62:

$$d_{13}{}^{-2} = [|\omega_{x1} - \omega_{x3}|^2 + |\omega_{y1} - \omega_{y3}|^2]^{-1}.$$

ROM 63 is responsive to the 10's complement summed outputs of ROM's 51 and 53 to provide the term $(d_{13}*)^{-2}$ corresponding to the reciprocal of the squares of the applied inputs. The respective recirpocal terms $d_{13}{}^{-2}$ and $(d_{13}*)^{-2}$ from ROM's 62 and 63, respectively, are then applied to comparator 71 for a determination of the greater of them, corresponding to a least spacing interval.

Thus, the embodiment illustrated in FIG. 14b mechanizes Equation (1) for the term E, corresponding to the degree of fitness of a fingerprint area under examination as an area of interest. Such signal may be submitted to a multiple level thresholding, as indicated by FIG. 13, within output buffer 33b (in FIG. 8) as an element of the non-fingerprint region indicator 23 of FIG. 7. In this way, a control signal of discrete levels may be provided for control of an automatic fingerprint reader system, as indicated in FIG. 7.

The design and functioning of a ROM, as a look-up table responsive to selected addressing, is well understood in the art, while the number of addresses and responses sought for the few discrete address frequencies employed is rather limited as to be well within the art of such commercially available devices. One such commercially available device is INTEL Model 2701, manufactured by INTEL Corp. of Santa Clara, California. In other words, a ROM may be considered as a single-valued arbitrary function generator, an appropriate output from which is provided in response to a selected address (or argument) among a list of discrete addresses, as is well understood in the art.

Accordingly, there has been described highly useful means for monitoring an image of interest to determine the existence of a fingerprint region of interest or, conversely, a non-fingerprint region not of interest, whereby machine memory and data processing time may be economized in the automatic processing of fingerprint data.

Although the concept of the invention has been described in terms of an embodiment employing a two-dimensional fast Fourier transform machine, it is clear that the concept of the invention is not so limited, and that any suitable form of sequency function analyzer may be employed. Also, although the testing or scoring signal has been indicated as employing two laser predominant energy terms in addition to the most predominant energy term, it is clear that the concept is not so limited and that any number may be employed, but that at least a second predominant term is to be employed. Further, although such subsequent, lesser predominant terms have been "scored" or attenuated by the reciprocal of the square of the frequency spacing $d_{1i}{}^i$, the concept is not so limited and such attenuation may be omitted or provided as any suitable function of the spacing frequency.

Although the invention has been disclosed and illustrated in detail, it is to be clearly understood that the same is by way of illustration and example only and is not to be taken by way of limitation, the spirit and scope of this invention being limited only by the terms of the appended claims.

We claim:

1. A pre-edit signalling system responsive to an electrical signal analog of a scanned image for indicating the probable absence or presence of a non-fingerprint region of such image, said system comprising a two-dimensional sequency function transform analyzer responsive to a binary-coded image signal for identifying discrete frequency terms occurring within a preselected bandwidth corresponding to a spatial frequency region associated with descriptions of a fingerprint image; and logic means responsive to said bandwith limited transform analyzer for further identifying the relative energy level of the bandwidth-limited spectral content of the binary-coded image signal as an indication of the inclusion of a non-fingerprint region within the scanned image represented by said binary-coded signal analog.

2. The device of claim 1 in which said logic means includes multiple level thresholding means responsive to the total energy represented by the output of the bandwidth limited transform analyzer for indicating a degree of probability that the scanned image represents a non-fingerprint region.

3. The device of claim 1 in which said logic means comprises:

means for determining the total energy E represented by the discrete frequency term output of the bandwidth limited transform analyzer, as the signal sum of selected signals in the output of said analyzer and corresponding to at least the largest energy component occurring at a discrete first frequency, and a second largest energy component occurring at a second discrete frequency, said signal corresponding to said second largest energy component being attenuated as a function of the frequency spacing between the spatial frequencies of said largest and second largest energy components.

4. The device of claim 1 in which said logic means comprises:

means for determining the total energy E represented by the discrete frequency term output of the bandwidth limited transform analyzer, as the signal sum of selected signals in the output of said analyzer and corresponding to the largest energy component occurring at a discrete first frequency, a second largest energy component occurring at a second discrete frequency, and a third energy component occurring at a third discrete frequency, each of said signals corresponding to said second and third largest energy components being attenuated as a function of the frequency spacing between the spatial frequencies of said largest and respective second and third largest energy components.

5. The device of claim 3 or 4 in which said logic means further included means for identifying that discrete frequency term having the largest energy component associated therewith and comprising:
register means responsive to a current output sample and associated two-dimensional frequency address for temporary storage of said sample and associated address;
storage means for storing a previous data sample and the associated address thereof; and
comparator means responsive to said register means and storage means for comparing said current and previous data samples, said comparator cooperating with said storage means to dump said stored previous data sample and associated address and substitute said current sample and associated address in said storage means, in response to said current sample exceeding said stored sample.

6. The device of claims 2, 3 or 4 in which said means for determining the total energy E comprises:
amplitude means responsive to data sets ($e_i$, $\omega_{xi}$ and $\omega_{yi}$) representing the two-dimensional discrete frequency transform output of the transform analyzer for determining that data set corresponding to a predominant data set ($e_i$, $\omega_{xi}$, $\omega_{y1}$) and at least a second next most predominant data set ($e_2$, $\omega_{x2}$ and $\omega_{y2}$), where $|e_1| < |e_2|$;
frequency spacing means responsive to the two-dimensional frequency coordinates associated with said first predominant and at least a second next most predominant data set for determining an attenuation factor;
attenuation means responsive to said frequency spacing means for attenuation of an energy term of said second predominant data set; and
signal combining means responsive to said amplitude means and said attenuation means for providing a signal output E indicative of the sum of said predominant energy term and said attenuated energy term.

7. The device of claim 1 in which said logic means includes:
first signalling means responsive to the discrete frequency term output of the bandwidth limited transform analyzer for generating a signal indicative of the largest energy component occurring at a discrete first frequency,
second signalling means responsive to said first signalling means for generating a signal indicative of a second largest energy component occurring at a second discrete frequency, said second signalling means including signal attenuating means for attenuating said signal indicative of said second largest energy component as a function of the frequency spacing between said first and second discrete frequencies.

8. The device of claim 1 in which said logic means includes:
first signalling means responsive to the discrete frequency term output of the bandwidth limited transform analyzer for generating a signal indicative of the largest energy component occurring at a discrete first frequency,
second signalling means responsive to said first signalling means for generating a signal indicative of a second largest energy component occurring at a second discrete frequency, said second signalling means including signal attenuating means for attenuating said signal indicative of said second largest energy component as a function of the frequency spacing between said first and second discrete frequencies; and
summing means responsive to said first and second signal means for providing an output indicative of the sum of the inputs thereto.

9. The device of claim 1 in which said logic means comprises
means for determining the total energy E represented by the discrete Fourier term output of the bandwidth limited fast Fourier transform analyzer, as the sum of selected signals in the output of said analyzer and corresponding to at least the largest energy component occurring at a discrete first frequency, a second largest energy component occurring at a second discrete frequency, said signal corresponding to said second largest energy component being attenuated as a function of the frequency spacing between the spatial frequencies of said largest and second largest energy components, and
multiple thresholding means responsive to said means for determining for indicating ones of preselected threshold levels exceeded by the bandwidth limited response of said analyzer.

10. The device of claim 1 in which said logic means includes means for identifying those respective discrete Fourier terms having the largest and second largest energy components, respectively, and the associated two-dimensional frequency addresses thereof.

11. The device of claim 10 in which said means for identifying includes:
first peak detection means adapted to be responsive to an applied input for storing a first detected peak value ($e_1$) of a data train and discarding all other data of the data train, and
second peak detecting means responsive to said all other data of the data train for storing a second peak detected value ($e_2 < e_1$) of said data train and discarding the remainder of the data.

12. A pre-edit signalling subsystem for use in a fingerprint identification system and responsive to an electrical signal analog of a scanned image for indicating the presence/absence of a non-fingerprint region of such image, said subsystem comprising:
a two-dimensional sequency transform analyzer responsive to a binary-coded image signal for identifying the two largest discrete frequency terms occurring within a selected bandwidth corresponding to a spatial frequency region describing the description of a fingerprint image; and
logic means responsive to said bandwidth limited transform analyzer for further identifying the relative energy levels of the spectral content of the binary-coded image signal, for indicating the probability that the scanned image represented by said binary coded signal analog represents a non-fingerprint region.

13. A pre-edit signalling system responsive to an electrical signal analog of a scanned image for indicating the probable absence or presence of a non-fingerprint region of such image, said system comprising signalling means response to a grey level electrical signal corresponding to a scanned image, for providing a compacted, thresholded binary-coded electrical signal;

a two-dimensional sequency transform analyzer responsive to said binary-coded signal for identifying discrete frequency terms occuring within a preselected bandwidth corresponding to a spatial frequency region associated with descriptions of a fingerprint image; and logic means responsive to said bandwidth limited transform analyzer for further identifying the relative total energy level of the bandwidth limited spectral content of the binary-coded image signal as in terms of the probability of the scanned image corresponding to said binary-coded signal representing a non-fingerprint region.

14. The device of claim 13 in which said signalling means comprises data comparator means responsive to a matrix ($n \times n$) of discrete grey level first pixels corresponding to an image field of interest for combining clusters of contiguous grey level pixels to provide a compacted matrix ($N/2 \times n/2$) of second pixels, each said second pixel having a grey level corresponding to the average grey level of the associated pixel cluster represented by such second pixel.

15. The device of claim 14 in which said signalling means further comprises means for thresholding signals representing said second pixels of said compacted matrix to provide binary-coded signals corresponding to a binary-coded data matrix representing said scanned image.

16. A pre-edit signalling system responsive to an electrical signal analog of a scanned image for indicating the probable absence or presence of a non-fingerprint region of such image, said system comprising a two-dimensional periodic function transform analyzer responsive to a binary-coded image signal for identifying discrete periodic function frequency terms occurring within a preselected bandwidth corresponding to a spatial frequency region associated with descriptions of a fingerprint image; and logic means responsive to said bandwidth limited transform analyzer for further identifying the relative energy level of the bandwidth-limited spectral content of the binary-coded image signal as an indication of the inclusion of a non-fingerprint region within the second image represented by said binary-coded signal analog.

17. The device of claim 16 in which said logic means comprises: means for determining the total energy E represented by the frequency term output of the bandwidth limited transform analyzer, as the sum, $$e_1 + (e_2/d_{12}^2) + (e_3/d_{13}^2),$$

where $e_1$ = the largest energy component occurring at a first discrete frequency $e_2$ = a second largest energy component occurring at a second discrete frequency $e_3$ = a third energy component occurring at a third discrete frequency $d_{12}$ = the frequency interval or spacing between $e_1$ and $e_2$ $d_{13}$ = the frequency interval or spacing between $e_1$ and $e_3$.

18. The device of claim 17 in which said logic means further includes means for identifying that discrete Fourier term having the largest energy component associated therewith and comprising:

a first register responsive to a current serial output sample of said fast Fourier transform analyzer for temporary storage of said current sample;

first storage means for storing a previous data sample input thereto;

a comparator responsive to said first register and said first storage means for comparing the amplitudes represented by said current sample and previous sample;

a second register responsive to a two-dimensional frequency address of said fast Fourier serial output sample; and a second register for storing a two-dimensional frequency address associated with said previous data sample, said comparator, in response to said current sample exceeding said stored sample, cooperating to dump said stored previous sample and associated stored address from said first and second storage means, respectively, and substitute said exceeding current sample and the associated address therefor in a respective one of said storage means.

19. The device of claim 17 in which said logic means further includes means for identifying that discrete Fourier term having the largest energy component associated therewith and comprising:

register means responsive to a current said output sample and associated two-dimensional frequency address for temporary storage of said sample and associated address;

storage means for storing a previous data sample and the associated address thereof; and comparator means responsive to said register means and storage means for comparing said current and previous data samples, said comparator cooperating with said storage means to dump said stored previous data sample and associated address and substitute said current sample and associated address in said storage means, in response to said current sample exceeding said stored sample.

20. The device of claim 17 in which said logic means includes means for identifying those respective discrete Fourier terms having the largest, and second and third largest energy components, respectively, and the associated two-dimensional frequency addresses thereof.

21. The device of claim 20 in which said means for identifying includes:

a first peak detection means adapted to be responsive to an applied input for storing a first detected peak value ($e_1$) of a data train and discarding all other data of the data train, second peak detecting means responsive to said all other data of the data train for storing a second peak detected value ($e_2 < e_1$) of said data train and discarding the remainder of the data, and third peak detecting means responsive to the remainder of said data train for storing a third peak value ($e_3 < e_2 < e_1$) of said data train.

22. The device of claim 16 in which said logic means includes multiple level thresholding means responsive to the total energy represented by the output of the bandwidth limited Fourier transform analyzer for indicating a degree of probability that the scanned image represents a non-fingerprint region.

23. The device of claim 16 in which said logic means comprises means for determining the total energy E represented by the discrete Fourier term output of the bandwidth limited fast Fourier transform analyzer, as the sum, $$e_1 + (e_2/d_{12}^2) + (e_3/d_{13}^2),$$

where
- $e_1$ = the largest energy component occurring at a discrete first frequency
- $e_2$ = a second largest energy component occurring at a second discrete frequency
- $e_3$ = a third energy component occurring at a third discrete frequency
- $d_{12}$ = the frequency interval or spacing between $e_1$ and $e_2$
- $d_{13}$ = the frequency interval or spacing between $e_1$ and $e_3$; and multiple thresholding means responsive to said means for determining for indicating ones of preselected threshold levels exceeded by the bandwidth limited response of said analyzer.

24. A pre-edit signalling subsystem for use in a fingerprint identification system and responsive to an electrical signal analog of a scanned image for indicating the presence/absence of a non-fingerprint region of such image, said subsystem comprising:
a two dimensional fast Fourier transform analyzer responsive to a binary-coded image signal for identifying the two largest discrete Fourier terms occurring within a selected bandwidth corresponding to a spatial frequency region describing the description of a fingerprint image; and
logic means responsive to said bandwidth limited fast Fourier transform analyzer for furtheer identifying the relative energy levels of the spectral content of the binary-coded image signal, for indicating the probability that the scanned image represented by said binary coded signal analog represents a non-fingerprint region.

25. A pre-edit signalling system responsive to an electrical signal analog of a scanned image for indicating the probable absence or presence of a non-fingerprint region of such image, said system comprising
signalling means response to a grey level electrical signal corresponding to a scanned image, for providing a compacted, thresholded binary-coded electrical signal;
a two dimensional fast Fourier transform analyzer responsive to said binary-coded signal for identifying discrete Fourier terms occurring within a preselected bandwidth corresponding to a spatial frequency region associated with descriptions of a fingerprint image; and
logic means responsive to said bandwidth limited fast Fourier transform analyzer for further identifying the relative total energy level of the bandwidth limited spectral content of the binary-coded image signal as in terms of the probability of the scanned image corresponding to said binary-coded signal representing a non-fingerprint region.

26. The device of claim 25 which said sampling means comprises
data comparator means responsive to a matrix ($n \times n$) of discrete grey level first pixels corresponding to an image field of interest for combining clusters of contiguous grey level pixels to provide a compacted matrix ($n/2 \times n/2$) of second pixels, each said second pixel having a grey level corresponding to the average grey level of the associated pixel cluster represented by such second pixel.

27. The device of claim 25 in which said signalling means further comprises means for thresholding signals representing said second pixels of said compacted matrix to provide binary-coded signals corresponding to a binary-coded data matrix representing said scanned image.

28. The device of claims 17, 23 or 27 in which said logic means E comprises:
amplitude means responsive to data sets ($\omega_{xi}$, $\omega_{yi}$ and $e_i$) representing the two-dimensional discrete Fourier transform output of the fast Fourier transform analyzer for determining that data set corresponding to a predominant data set ($e_1$, $\omega_{x1}$, $\omega_{y1}$) and a second and third next most predominant data set ($e_2$, $\omega_{x2}$ and $\omega_{y2}$) and ($e_3$, $\omega_{x3}$ and $\omega_{y3}$), where $|e_1| > |e_2| > |e_3|$,
frequency spacing means responsive to the two dimensional frequency coordinates associated with said first predominant second and third next most predominant data sets for determining the frequency spacing factors $d_{12}^{\frac{1}{2}}$ and $d_{13}^{\frac{1}{2}}$,
signal combining means responsive to said amplitude means and frequency spacing means for providing a signal output E indicative of the relationship, $e_1 + (e_2/d_{12}^2) + (e_3/d_{13}^2)$.

29. The device of claim 28 in which said signal combining means comprises:
first multiplier means responsive to data element $e_2$ and factor $d_{12}^{\frac{1}{2}}$ for providing an output $e_2/d_{12}^2$ corresponding to the product of the applied inputs thereto;
second multiplier means responsive to data element $e_3$ and factor $d_{13}^{\frac{1}{2}}$ for providing an output $e_3/d_{13}^2$ corresponding to the product of the applied inputs thereto; and
output data summing means responsive to data element $e_1$ and to the outputs of said first and second multiplier means for providing an output E corresponding to the sums of the applied inputs thereto.

* * * * *

UNITED STATES PATENT AND TRADEMARK OFFICE
CERTIFICATE OF CORRECTION

PATENT NO. : 4,225,850

DATED : September 30, 1980

INVENTOR(S) : Tien-Lin Chang et al

It is certified that error appears in the above-identified patent and that said Letters Patent are hereby corrected as shown below:

Column 17, line 39, correct "<" to read ---->----.

Column 19, line 31, correct "N" to read ---n---; line 56, correct "second" to read ---scanned---.

Column 22, line 41, correct "$d_{12}^{1/2}$ and $d_{13}^{1/2}$" to read --- $\frac{1}{d_{12}^2}$ and $\frac{1}{d_{13}^2}$, and---; line 49, correct "$d_{12}^{1/2}$" to read --- $\frac{1}{d_{12}^2}$ ---; line 53, correct "$d_{13}^{1/2}$" to read --- $\frac{1}{d_{13}^2}$ ---.

Signed and Sealed this

Twelfth Day of May 1981

[SEAL]

Attest:

RENE D. TEGTMEYER

Attesting Officer     Acting Commissioner of Patents and Trademark